Oct. 1, 1940.  A. F. WARD  2,216,147
ALUMINUM BAKING PAN
Filed Feb. 1, 1939  2 Sheets-Sheet 1

INVENTOR
Ashley F. Ward

Oct. 1, 1940.  A. F. WARD  2,216,147
ALUMINUM BAKING PAN
Filed Feb. 1, 1939  2 Sheets-Sheet 2
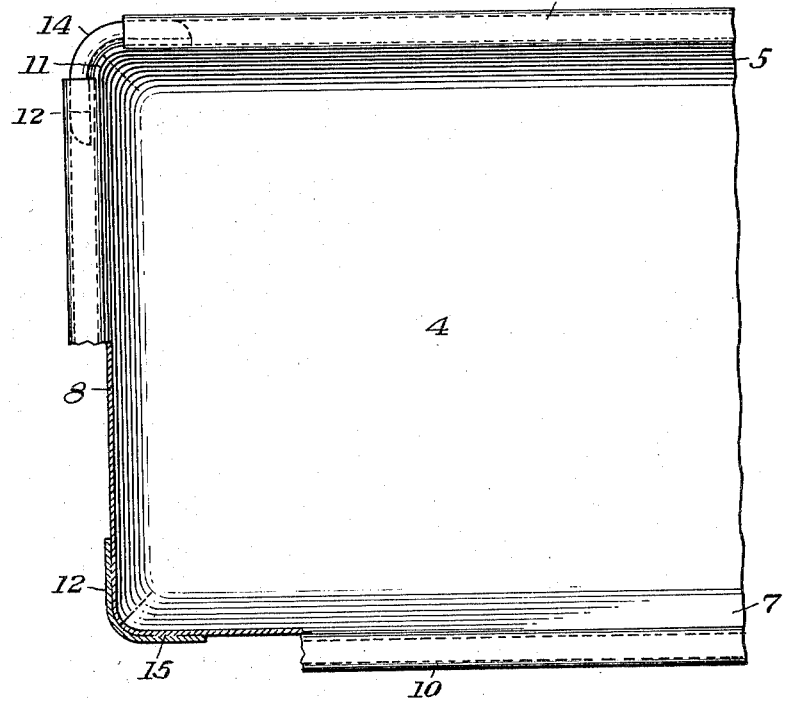
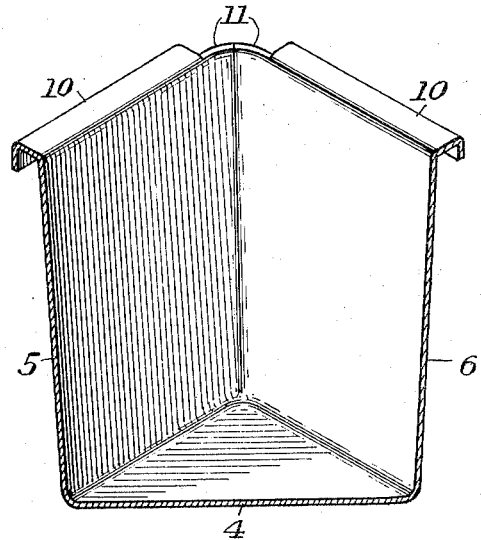
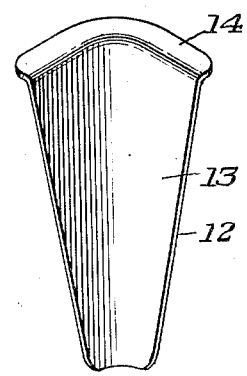
INVENTOR
Ashley F. Ward Patented Oct. 1, 1940

2,216,147

UNITED STATES PATENT OFFICE 2,216,147

ALUMINUM BAKING PAN

Ashley F. Ward, Cincinnati, Ohio

Application February 1, 1939, Serial No. 254,016

3 Claims. (Cl. 220—62)

This invention relates to baking pans made of sheet metal and particularly to baking pans made of relatively hard metal of low ductility such as full hard cold rolled aluminum or similar material. The invention contemplates a baking pan which can be made of metal which cannot practicably be deep drawn into baking pan form and which cannot be folded to make the common type of folded baking pan without cracking.

Baking pans have heretofore been made either by drawing or by folding. For either of these methods a relatively soft and ductile material is required. Yet it is highly desirable to use a comparatively hard material such as full hard cold rolled aluminum for the manufacture of articles of this type in order to preserve their shape and prolong their life. I have devised a baking pan which can be made out of a relatively hard nonductile material and which eliminates the disadvantages incident to baking pans, either drawn or folded, heretofore made. Drawn baking pans are satisfactory in use, but the cost of manufacture thereof, and particularly the die cost, is very high. Folded pans have the disadvantage that the folding leaves a bad crease adjacent the corner of the pan, which crease accumulates dirt and grease and marks the loaf or other baked product and causes it to stick in the pan. Moreover, such pans, whether drawn or folded, are liable to damage upon handling and stacking, particularly in commercial bakeries in which the pans are used almost constantly and are subjected to repeated temperature changes and cleaned almost daily. The greatest difficulty has been encountered with the corners of the pans and the life of the weakest corner generally constitutes the limiting factor in the life of the pan as a whole. This is due partly to the lack of sufficient strength at the pan corners and partly to the necessity of using a comparatively soft ductile material in making the pans.

I have devised a baking pan obviating all of the disadvantages of both drawn and folded pans. In the first place my pan can be made out of a relatively hard material such as full hard cold rolled aluminum and similar material. This lends to the pan a greatly increased strength and consequently a materially lengthened life. In addition to this, however, I provide for still further strengthening the pan corners to withstand the battering to which they are subjected in use and in stacking. I eliminate the cost of drawing dies and the unavoidable unsanitary conditions incident to the use of folded pans.

I provide a pan which is neither folded nor deep drawn, although it is slightly drawn as an incident to its formation, and which has corner reinforcing members which maintain the integrity of the corners of the pan and also reinforce and strengthen the sides of the pan adjacent the corners and further reinforce and strengthen the top rim of the pan. The top rim of the pan is formed by bending the upper edges of the sides of the pan to stiffen them, and the corner reinforcing members cooperate with the bent edges of the sides of the pan to form a substantially continuous stiffened rim about the pan. The corner reinforcing members are preferably connected as by welding to the adjacent sides, which sides preferably abut each other at a corner of the pan. The corner reinforcing members are preferably applied to the exterior of the pan where they act as buffers to take wear and abrasion in nesting of the pans. The upper edges of the sides of the pan are preferably bent or turned outwardly, as is also the case with the upper edges of the corner reinforcing members. Also the upper edges of the corner reinforcing members and the upper edges of the adjacent sides preferably interfit to form a continuous and reinforced top rim for the pan.

Other details, objects and advantages of the invention will become apparent as the following description of a present preferred embodiment thereof proceeds.

In the accompanying drawings I have shown a present preferred embodiment of the invention, in which Figure 1 is a face view of a blank for making a baking pan;

Figure 3 is a plan view partly in horizontal cross section and to enlarged scale of a portion of the pan shown in Figure 2;

Figure 4 is a perspective view to enlarged scale of a portion of the blank shown in Figure 1 after being formed into pan shape but before application of the corner reinforcing members; and Figure 5 is a perspective view of a corner reinforcing member.

Figure 1:
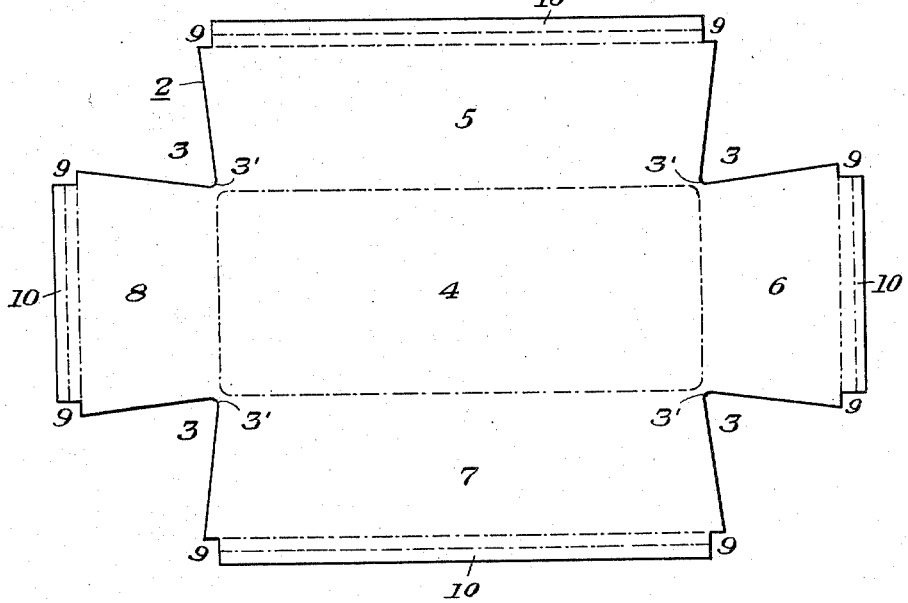

Referring now more particularly to the drawings, a blank for making a baking pan is shown in face view in Figure 1. Such blank is preferably of aluminum or similar sheet material and is designated generally by reference numeral 2. It is formed generally in the shape of a rectangle with its corners cut out as indicated at 3, the corners of the blank being slightly rounded as shown at 3'. The blank with the corners 3 cut out comprises a central portion 4 which when the blank is formed into pan shape forms the bottom of the pan and four side flaps 5, 6, 7 and 8, each integrally connected with the central portion 4 of the blank. In the form shown the side flaps 5 and 7 are relatively long as compared with the side flaps 6 and 8, so the pan which the blank will form will be of generally oblong shape such as is used for the baking of a loaf of bread. Each of the side flaps 5, 6, 7 and 8 has its outer corners cut out as shown at 9 so as to form thereon a relatively short projecting strip 10 at the outer edge of the flap.

The corners 3 of the blank 2 are preferably cut out along lines intersecting at an acute angle so that when the side flaps are turned up the pan will have a slight upward and outward taper. The corners 9 of the side flaps are preferably cut out along lines intersecting at substantially a right angle to enable formation of a rim structure for the pan to be presently described. The entire blank as shown in Figure 1 can be blanked out of sheet metal at a single operation by an ordinary blanking die, the initial blank preferably being rectangular so that at least the principal removal of material therefrom is at the corners. The longitudinal and transverse dimensions of the initial rectangular blank may be the same as those of the cut out blank shown in Figure 1 or they may be slightly greater so that the blanking die in addition to cutting out the corners may also trim the longitudinal and transverse edges of the initial blank to insure the cut out blank being of exactly the right size and shape.

The blank shown in Figure 1 is bent into generally pan shape by turning up each of the side flaps 5, 6, 7 and 8, and the ends of adjacent flaps preferably abut each other. The side flaps are substantially planar except at the juncture of each of the side flaps with the bottom portion 4 where the blank is slightly rounded and at the corners of the pan where the ends of each of the side flaps are also slightly rounded, as shown in Figure 4. This insures a strong durable construction. The bottom edges and corners of the pan are preferably slightly drawn; consequently the corners of the blank are rounded at 3' to allow for the draft and insure proper matching of the edges of the blank. The end portions of the side flaps which are rounded as indicated at 11 in Figure 4 are those portions of the side flaps extending beyond the relatively short projecting strips 10 shown in Figure 1. All four of the strips 10 are turned outwardly and then downwardly as shown in Figure 4, thus strengthening and stiffening the pan and forming a sanitary and convenient top rim of such shape as to facilitate handling of the pan. The formation of the blank 2 into generally pan shape is preferably effected in a suitable bending die having cooperating male and female die members, such die members having curved edges to form the bottom edges of the pan as well as the corners. The entire transformation from the flat blank shown in Figure 1 to the completely formed pan shaped blank shown in Figure 4 can be effected in a single stroke of the die, or the strips 10 may be outwardly and downwardly turned in a separate operation or operations either before or after formation of the pan as a whole.

There are provided four separate corner reinforcing members, one of which is shown in Figure 5 and each of which is designated generally by reference numeral 12. These corner reinforcing members are also preferably die formed, each comprising a generally flared trough shaped body portion 13 and an outturned flange 14 at the larger end. The corner reinforcing members 12 may be formed out of material removed from the corners of the initial blank so that the scrap loss is almost negligible. The curvature of the concave side of each of the corner reinforcing members 12 is substantially the same as the curvature of the outside of a corner of the blank 2 when formed into generally pan shape as shown in Figure 4.

Figure 2:
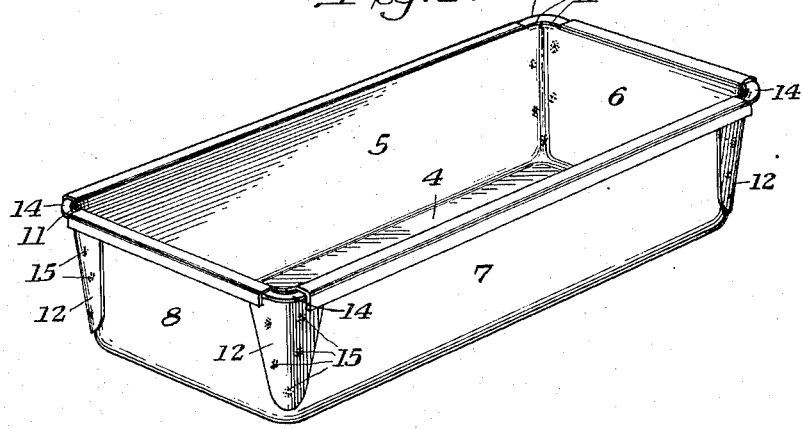
Figure 2 is a perspective view of a finished baking pan made from a blank such as that shown in Figure 1 and with corner reinforcing members applied thereto.

One of the corner reinforcing members 12 is applied to the exterior of each corner of the blank 2 after the latter has been bent into generally pan shape, the body 13 of the corner reinforcing member fitting against the outside of the corner of the pan shaped blank and the outturned flange 14 of the corner reinforcing member entering the outwardly and downwardly turned rim portion of each of the adjacent sides of the pan shaped blank as shown in Figures 2 and 3. Each of the corner reinforcing members 12 is spot welded to each of the adjacent sides of the pan shaped blank 2, as indicated at 15, so that it maintains the integrity of the corners of the pan and also reinforces the sides of the pan adjacent the corners as well as reinforcing the side rim portions. The corner reinforcing members also serve as buffers to withstand the battering to which the pans are subjected in use both in handling and in nesting. The sides of the pan are not connected or welded directly together but are connected only through the corner reinforcing members 12. By reason of the abutment of the sides the interior of the pan is smooth and continuous.

While pans as above described may not in all cases be perfectly watertight, they are ordinarily so, and, in any event, they are tight enough to serve their purpose as baking pans and are less likely to have their corners seriously damaged or opened up than pans of the types heretofore in use as above described. The provision of the corner reinforcing members strengthens the entire pan, as they form in effect legs at the corners of the pan, strengthening it in the vertical direction, and they also stiffen and strengthen the pan sides as a whole in addition to completing and reinforcing the outturned stiffened rim of the pan.

While I have shown and described a present preferred embodiment of the invention, it is to be distinctly understood that the same is not limited thereto but may be otherwise variously embodied within the scope of the following claims.

I claim:

1. A baking pan of aluminum or similar material comprising a body having integral sides and bottom, adjacent sides abutting each other at a corner of the pan and each having a portion of its upper edge turned outwardly and downwardly to form a portion of a stiffened rim of the pan, and a separate corner member applied to the exterior of the pan, connected with the adjacent sides and bridging the crack therebetween and having an outwardly turned upper edge portion interfitting with the outwardly and downwardly turned upper edge portions of the adjacent sides to form a continuous stiffened rim.

2. A baking pan of aluminum or similar material comprising a body having integral sides and bottom, adjacent sides each having a portion of its upper edge turned outwardly and downwardly to form a portion of a stiffened rim of the pan, and a separate corner member applied to the exterior of the pan, connected with the adjacent sides and having an outwardly turned upper edge portion interfitting with the outwardly and downwardly turned upper edge portions of the adjacent sides to form a continuous stiffened rim.

3. A baking pan of aluminum or similar material made out of a generally rectangular blank having its corners cut out to provide four side flaps, each of the side flaps having its outer corners cut out, the side flaps being turned up relatively to the central portion of the blank which forms the bottom of the pan, the outer edges of the sides between the cut out outer corners thereof being bent to form portions of a stiffened rim of the pan, and means joining adjacent sides at the corners of the pan and having portions forming the corners of the rim of the pan so that the rim is substantially continuous thereabout.

ASHLEY F. WARD.